UNITED STATES PATENT OFFICE.

XAVIER DEBEDAT, OF BORDEAUX, FRANCE.

PROCESS OF MANUFACTURING COLORING SUBSTANCES.

999,755.  Specification of Letters Patent.  Patented Aug. 8, 1911.

No Drawing.  Application filed March 1, 1910. Serial No. 546,632.

*To all whom it may concern:*

Be it known that I, XAVIER DEBEDAT, a citizen of the French Republic, residing at Bordeaux, Gironde, in France, have invented certain new and useful Improved Coloring Substances and Process for the Manufacture of the Same, of which the following is a specification.

This invention relates to improved coloring substances and process for the manufacture of the same.

The improved coloring matter is extracted from plants containing tannin and more especially from heather, by treating either the bark, the stalk or the root as hereinafter described.

The process of extracting the dye consists in first boiling the bark, stalk, or broken wood in pure water, to extract the tannins and afterward in alkaline water. The alkaline liquor which absorbs all the coloring substance contained in the wood after the extraction of the soluble tannins can be used as it is, or evaporated to furnish an alkaline carmine which can be again dissolved by boiling water and be used for dyeing purposes or the alkaline liquor can be treated with an acid by which an abundant flaky precipitate is obtained. This precipitate can be collected by filtration and is thoroughly washed in cold water in which it is insoluble, and is then dried in a stove. It shrinks considerably when drying and forms a friable extract which is not changed by any acid, alkalis alone being able to dissolve it to a liquid of bright color reproducing all the properties of the original alkaline liquid without the slightest change of coloring or dyeing properties. The dye is thus commercially available in its original alkaline form or in acid form.

The process is as follows:

1. Crush or powder finely vegetable tissues containing tannin such as heather, chestnut tree, pine bark, oak bark, etc.

2. Treat the crushed substances with hot water at a pressure and temperature according to the different plants as these pressures and temperatures vary with each plant. In the case of heather the maximum extraction of tannin is obtained at normal pressure at relatively low temperature of from 60 to 70° C.

3. Boil the substances in alkaline water in contact with air. The quantity of alkali varies according to the acid properties of the plant. It should be sufficient to maintain a clearly alkaline reaction of the liquid to the end of the preparation. In the case of heather the following proportions are suitable: pulverized heather wood, 1 kilogram; carbonate of soda, 300 grams; water, 26 pints. Boiling is continued until the whole is reduced in volume to 18 pints.

4. The alkaline liquor which has absorbed all the coloring matters which the wood contained after the extraction of the soluble tannins can be (a) employed as it is, (b) evaporated to furnish an alkaline carmine soluble in hot water, (c) treated with an acid to furnish an acid carmine soluble in the alkalis. The evaporation of the alkaline liquor for the obtention of alkaline carmine should be done protected from air as the absorption of oxygen would otherwise be considerable and would vary the tint of the carmine and also its weight.

The product which can be designated as heather carmine is insoluble in cold water, alcohol, ether, chloroform, benzin, and the like. In the alkaline form the product, although slightly hygrometrical, can easily be preserved, but in acid form it is only very slightly hygrometrical and can be indefinitely preserved.

When the acid dye is prepared by precipitation the waste liquid produces a coloring substance giving orange rose colors which are useful both in their light as well as in their deeper tones. Consequently a second coloring matter is obtainable.

According to the part of the plant treated, the dye obtained will be of different tints. The dye when extracted from the bark is of a brown tint. When extracted from the wood, the branches or stumps it gives rose tints, purples, wine colors, etc.

By using the dye similarly to the dye obtained from and known as dyer's-weed, wool, silk or cotton can be given a fine range of colors without mixing the dye with other coloring substances.

Among the mordants which can be used is potash alum but for silk mordants are not indispensable. This heather dye can also be used with other coloring substances and so can form mixtures with coloring substances of the same vegetable origin, such as the lakes of vegetable colors; further it can be used not only for dyeing wool, silk and cotton, but also for wood, feathers and other materials. It can also be used for the manufacture of water colors and paints. The tints obtained resist the action of weather, light, heat and the like.

The invention provides a new color capable of producing a great number of shades.

What I claim as my invention and desire to secure by Letters Patent of the United States is:—

1. A process for producing coloring substances consisting in boiling tannin containing plants in water to extract the tannin after which the chromogene substances still contained in the plants are extracted by boiling the same in an alkaline liquid and subsequently evaporating the liquid, substantially as described.

2. A process of producing coloring substances consisting in boiling tannin containing plants in water and then in an alkaline liquid, treating the solution with an acid to obtain a precipitate, and subsequently washing and drying said precipitate substantially as described.

3. A process of producing coloring substances consisting in boiling tannin containing substances in water and then in an alkaline liquid, treating the solution with an acid to obtain a precipitate, washing and drying said precipitate and subsequently dissolving same in an alkaline solution substantially as described.

4. A process for producing coloring substances consisting in boiling parts of the heather plant in water and then in an alkaline liquid, and subsequently evaporating the liquid, substantially as described.

5. A process for producing coloring substances consisting in boiling parts of the heather plant in water and then in an alkaline liquid, treating the solution with an acid to obtain a precipitate and washing and drying said precipitate.

In witness whereof I have signed this specification in the presence of two witnesses.

X. DEBEDAT.

Witnesses:
M. ATTESON,
A. VANNIER.

---

Copies of this patent may be obtained for five cents each, by addressing the "Commissioner of Patents, Washington, D. C."